(12) United States Patent
Hillard et al.

(10) Patent No.: US 6,765,880 B1
(45) Date of Patent: Jul. 20, 2004

(54) METHOD AND APPARATUS FOR ELIMINATING UNPROTECTABLE PATHS FROM CONSIDERATION DURING COMPUTATION OF A PROTECTABLE SHORTEST PATH TREE

(75) Inventors: David A. Hillard, Navato, CA (US); Anix Anbiah, Rohnert Park, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/487,366

(22) Filed: Jan. 18, 2000

(51) Int. Cl.[7] .............................................. H04L 12/28
(52) U.S. Cl. ..................................... 370/255; 370/258
(58) Field of Search ........................ 370/238, 254–256, 370/258, 216–228

(56) References Cited

U.S. PATENT DOCUMENTS 3,674,936 A * 7/1972 Wolfe .......................... 380/257
5,923,646 A * 7/1999 Mandhyan ................... 370/254
6,249,510 B1 * 6/2001 Thompson ................... 370/223

* cited by examiner

*Primary Examiner*—Seema S. Rao
*Assistant Examiner*—Ronald Abelson
(74) *Attorney, Agent, or Firm*—Ritter, Lang & Kaplan LLP (57) ABSTRACT

The invention comprises a method for computing the shortest protectable paths in communication networks, and a method for establishing and defining protected paths. The invention utilizes a new algorithm to exclude from consideration as the "shortest path" between two network elements, a path for which adequate protection cannot be established. Such an unprotectable path will contain one or more unprotectable links. These unprotectable links can be identified and excluded based upon whether or not the link is a member of a loop. Because there are several more computational steps in defining the protected paths, after the shortest path has been found, the initial exclusion of unprotectable path segments from consideration eliminates the potential waste of computational resources leading to a more rapid and efficient routing and provisioning of reliable network paths and circuits.

26 Claims, 7 Drawing Sheets

| ORDERED STEP SEQUENCE | SET OF EVALUATED NODES E | SET OF REMAINING NODES R | SET OF ORDERED PATHS O |
|---|---|---|---|
| 1 | N1 | N2, N3, N4 | N1-N3 = 10<br>N1-N2 = 40 |
| 2 | N1, N3 | N2, N4 | N1-N3-N4 = 20<br>N1-N2 = 40 |
| 3 | N1, N3, N4 | N2 | N1-N3-N4-N2 = 30<br>N1-N2 = 40 |
| 4 | N1, N3, N4, N2 | NULL | N1-N2 = 40<br>N1-N3-N4-N2-N1 = 70 |
| 5 | N1, N2, N3, N4 | NULL | N1-N3-N4-N2-N1 = 70 |

METHOD AND APPARATUS FOR ELIMINATING UNPROTECTABLE PATHS FROM CONSIDERATION DURING COMPUTATION OF A PROTECTABLE SHORTEST PATH TREE

CROSS-REFERENCES

This application is related to application Ser. No. 09/478,287, U.S. Pat. No. 6,614,785 filed on Jan. 5, 2000, entitled "Automatic Propagation of Circuit Information in a Communications Network," of which, Jin Huai is the inventor, and which describes a method of automatically detecting network topology and protection information. The aforementioned application is incorporated herein by reference, but is not admitted to be prior art.

BACKGROUND OF THE INVENTION

This invention deals generally with the routing of communication paths within complex multi-nodal communication networks. In particular, the invention addresses the routing of the shortest protected paths in such networks and discloses methods for identifying and discarding paths that are unprotectable.

The Shortest Path Tree (SPT) or Dijkstra's algorithm is a procedure used in link state protocol networks to optimize routing by finding the shortest path, or least cost path, between two network elements. A path between any two network elements, or nodes, consists of individual and contiguous path segments that begin at the source node and terminate on the target node. Path segments consist of individual and contiguous links. A link is a communications channel between two adjacent nodes. Given network nodes, which are connected by links, the question arises as to which is the shortest path between any two nodes, A and B. The term "shortest path" is relative to the cost metric, which is defined for the links and path segments that are part of the network. For example, the monthly cost of an optical link operating at Optical Carrier (OC)-3 could represent a cost metric. The shortest path is that path between two network elements which has the least cost, where the cost is the sum of the predefined costs of traversing each link or path segment in the path.

Figure 1:
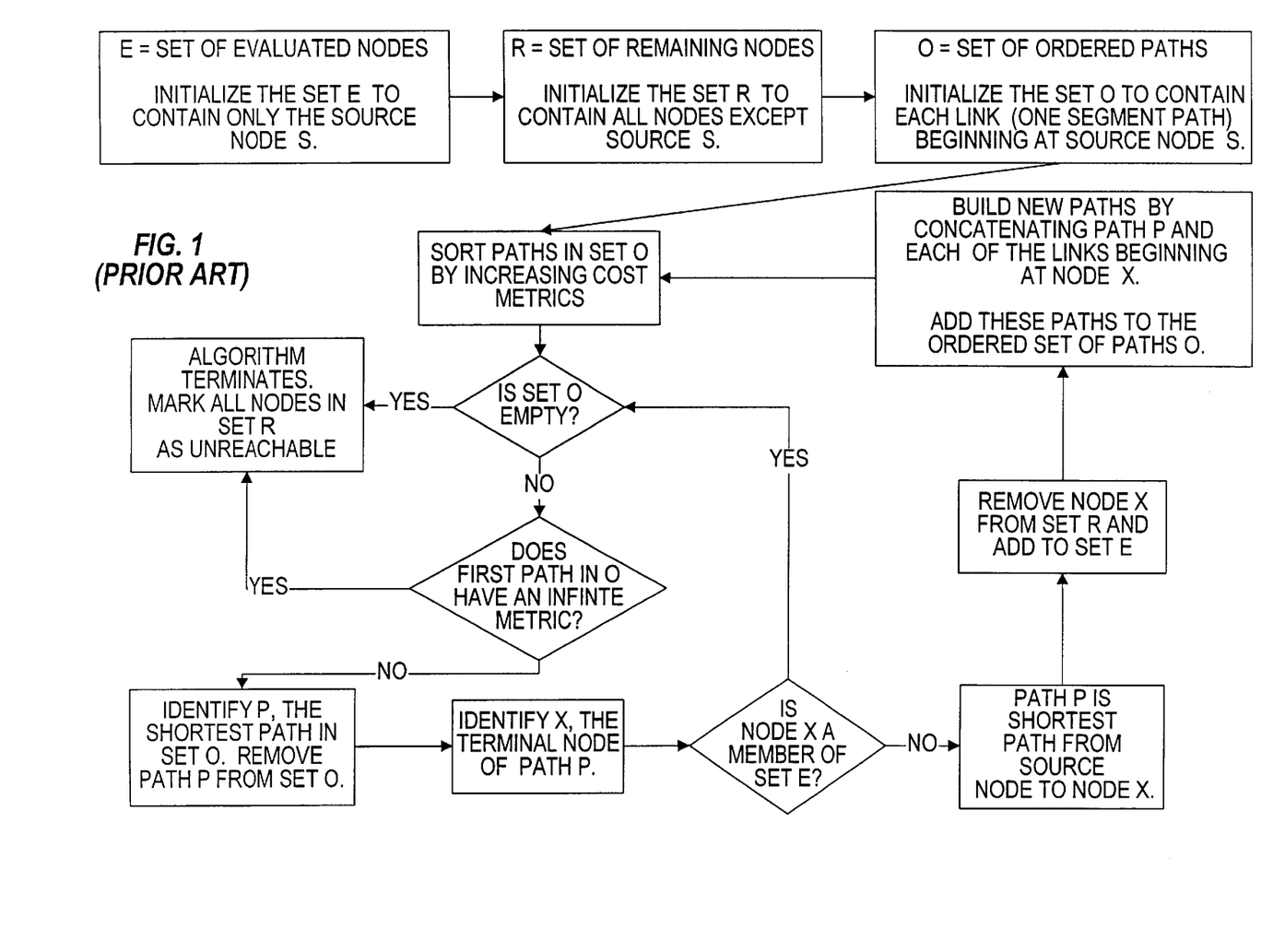
FIG. 1 illustrates a process flow of a generic form of the prior art Dijkstra's SPT algorithm.
Figure 2:
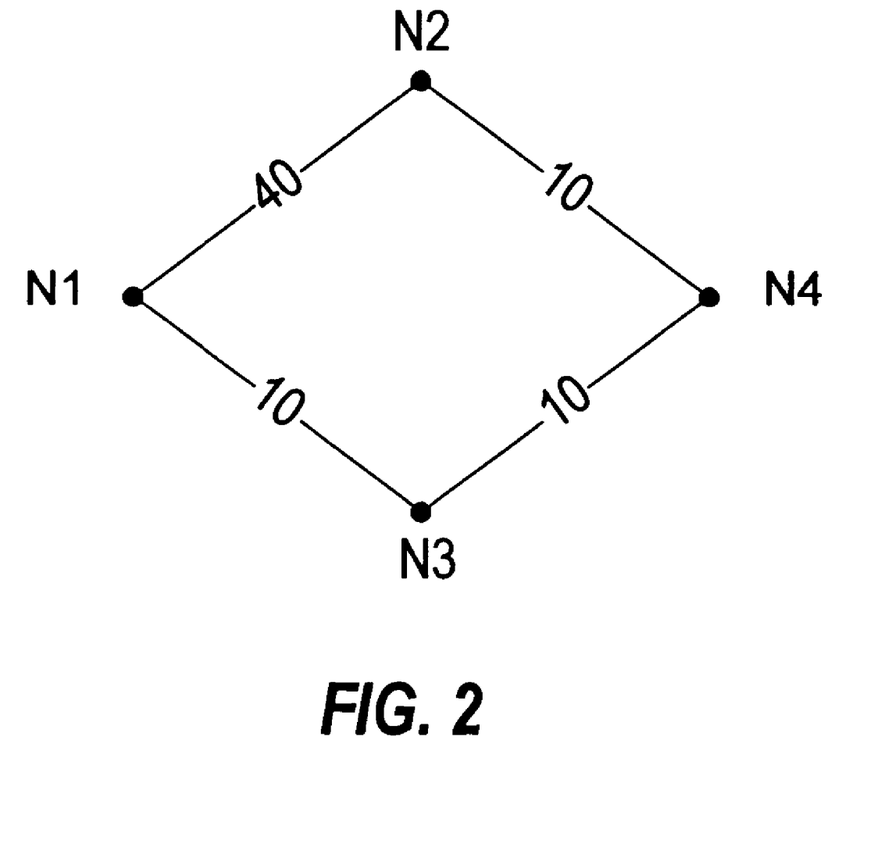
FIG. 2 shows a simplified representation of a four-node network, and the associated link metrics.
Figure 3:
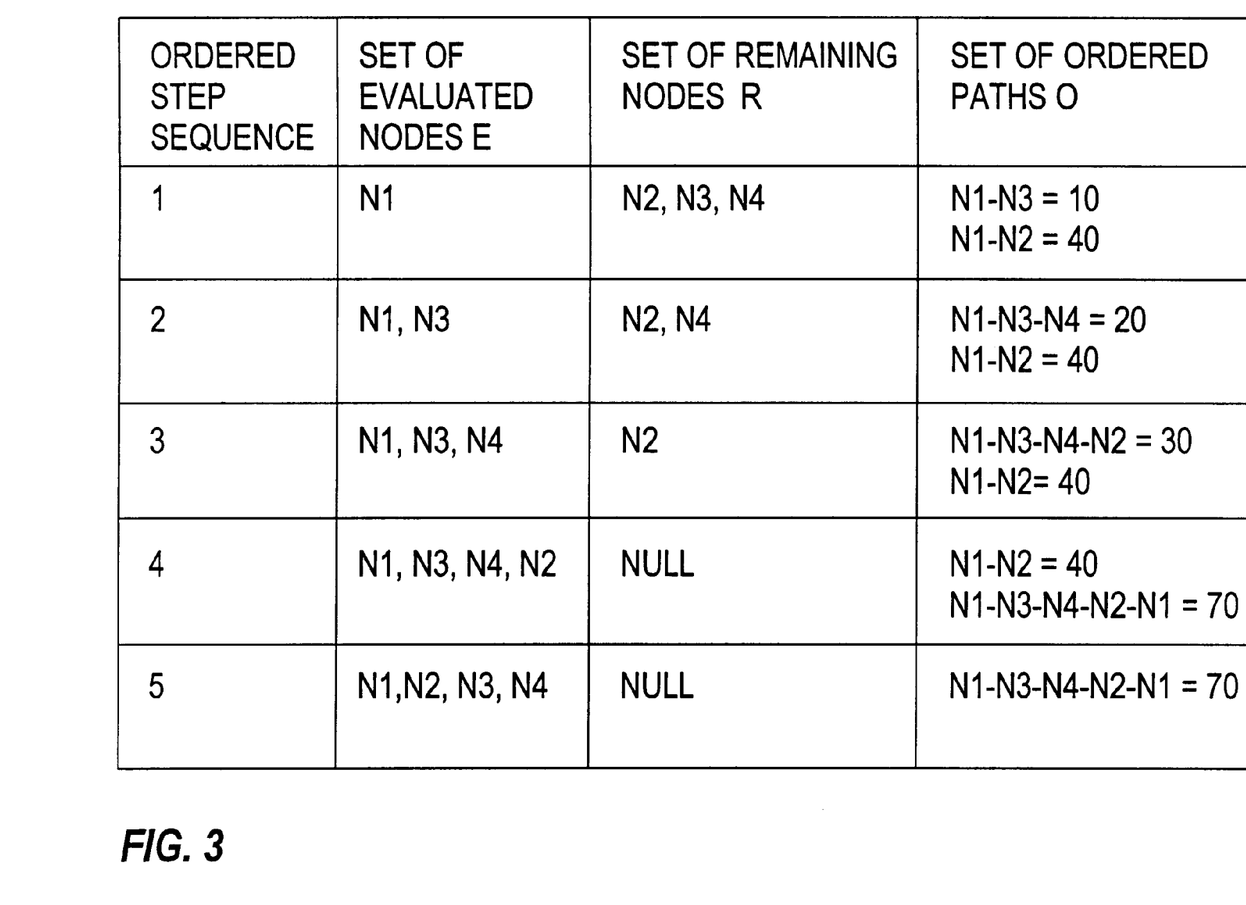
FIG. 3 illustrates a step by step execution of Dijkstra's SPT algorithm on the network shown in FIG. 2.

Dijkstra's algorithm, or SPT algorithm, is well known to those skilled in the art as a method for determining the shortest path between two network elements and is described in *Routing in the Internet,* authored by Christian Huitema, published by Prentice Hall, 1995, which is herein incorporated by reference. The process flow of Dijkstra's SPT algorithm for determining the shortest path between one network element, the source node, and all other network elements or nodes in the network is illustrated in FIG. 1. FIG. 2 shows a simplified representation of a four-node network, and the associated link metrics. FIG. 3 shows a table illustrating the step by step execution of Dijkstra's SPT algorithm as shown in FIG. 1, on the network shown in FIG. 2, with node N1 as the source node. There is a new shortest path at each step, which is added to the shortest path tree, while there are still unevaluated nodes.

In addition to the least cost or shortest path analysis, many communication networks require a high level of reliability. In such networks, a communication failure is relatively intolerable, and the need to insure adequate redundancy of communication channels in the event of failure is paramount. Synchronous Optical Networks (SONETs) and Synchronous Digital Hierarchy (SDH) networks are examples of such networks. When used herein, the term SONET is meant to include both SONET and SDH, the terms SONET and SDH being used interchangeably. Due to the nature of a SONET, the probability of a link or span failure due to a fiber cut, or other network element failure is significant enough to warrant the routing of protection circuits. Establishing protection insures that in the event that the primary communication circuit fails, there is alternate predefined circuit available to be used such that minimal interruption of service occurs.

For routing protected circuits in SONETs, it is useful to think of the path taken by circuits as comprised of path segments. Each path segment in the circuit is protected either due to the fact that each of the lines used by the segment is inherently protected, or by a redundant or back-up path segment. In a first instance, known as line protection, there is a redundant line or link for each link in a path. If the link fails for any reason, the network traffic traversing that failed link is switched to the redundant link. Line protection schemes such as Bi-directional Line Switched Rings (BLSR), the linear 1+1, and others are well known to those skilled in the art. In a second instance, that of path protection, the path itself is protected due to the existence of a predefined alternative path, which functions as a redundant path to be used in the event of failure of any part of the primary path segment. The primary path and its corresponding predefined alternative path, as a pair, represent an example of path protection. Path protection schemes such as Uni-directional Path Switched Rings (UPSR) are also well known to those skilled in the art. Path protection can also be thought of at the path segment level. Since a path can be thought of as a number of contiguous path segments, with some segments inherently protected while others are unprotected, it becomes desirable to establish protection for the unprotected path segments.

Establishing path protection entails establishing path segment protection for each unprotected path segment. This requires finding an alternate path segment which is referred to as a Virtual UPSR in SONET terminology. Each Path Switched Segment (PSS) is made up of a primary path segment and an alternate path segment. The two segments together form the Protected Path Switch Segment (PPSS). Further details regarding SONET protection schemes can be found in Bellcore specifications GR-253-CORE, GR-1400-CORE, and GR-1230-CORE, which are incorporated herein by reference. Typically, when provisioning circuits for network traffic, paths which are not protected are identified as such. These unprotected paths contain path segments that are not part of any inherent protection scheme. For instance, if the path segment itself is not part of a predefined path protection scheme, or if the segment contains individual links that are not part of a line protection scheme, the path is unprotected. For these unprotected paths, if an alternate edge disjoint path can be found which connects the same two nodes, then this alternate path can be used as the redundant back-up path, and the original path can be defined as being path protected. This is a way to ensure that every path segment within a path is protected.

Figure 4:
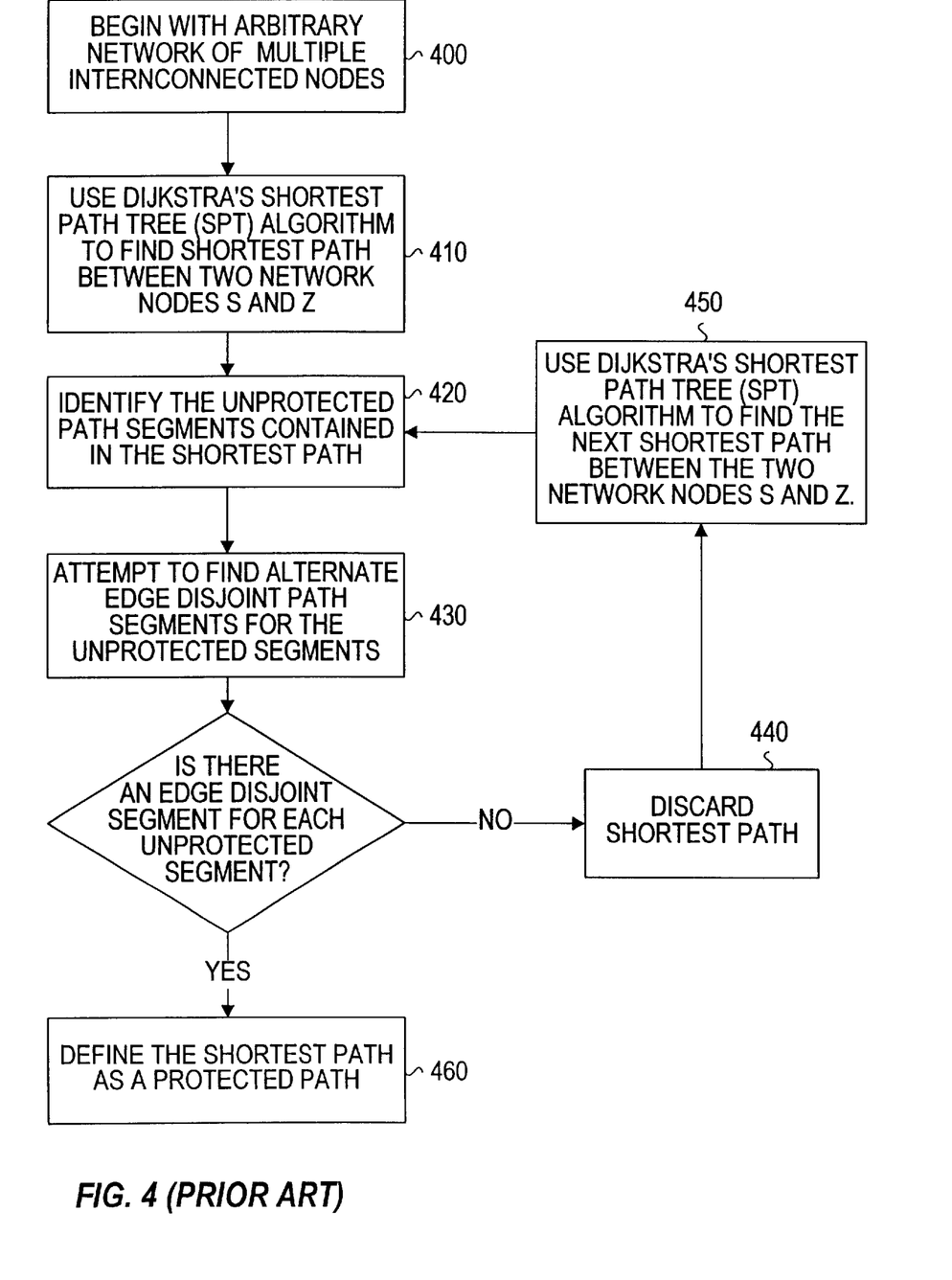
FIG. 4 shows a prior art process for defining protected paths within a network.

Networks in general, and SONETs in particular, may be configured to use, among others, Dijkstra's SPT algorithm to determine shortest paths for routing information between any two network elements. However, the SPT algorithm routes traffic based on the shortest path between nodes and does not account for or insure that the routed path is protected. The paths found by Dijkstra's SPT algorithm between two distant network elements are comprised of path segments between the intervening network elements. Some of these segments may be inherently protected due to the SONET configuration (BLSW, 1+1, UPSR, etc.), but other segments may be unprotected. Because protection may be a critical requirement in the provisioning of circuits, particularly in SONETs, there is the desire to obtain not only the shortest path between two network elements but the shortest protected path between those elements. One approach to finding the shortest protected path is now described. First, the shortest path is found using Dijkstra's SPT algorithm. Then, a determination is made as to whether or not the given path is protected. More specifically, a determination is made as to which path segments are not protected. If, as is common, one or more path segments are found to be unprotected, a search for an alternate path segment, or edge disjoint path segment, is made in order to provide redundancy protection for the unprotected segment. If an alternate edge disjoint path segment is found for the unprotected primary path segment, then that primary path segment can be defined as protected. If each unprotected path segment in a given path can be protected by means of finding an alternate path segment, then the entire path can be defined as protected. FIG. 4 shows a process for defining protected paths within a network. Given a network of linked network elements, and desiring to find the shortest protected path from one node S, to another node Z in the network:

1) Use Dijkstra's SPT algorithm to find the shortest path between the source node S and the destination node Z (410).
2) For the shortest path found in step 1, determine which path segments contained in the path are not protected (420).
3) For each unprotected path segments identified in step 2, attempt to find an alternate edge disjoint path segment (430). An alternate edge disjoint path segment is one that follows a different and disjoint path, yet shares the same two terminal nodes as that of the primary segment.
4) If an edge disjoint segment cannot be found for each unprotected path segment, discard the shortest path found in step 1 (440), continue Dijkstra's algorithm to find the next shortest path between nodes S and Z (450).
5) Define the protected paths (460). Define as protected those paths for which each of the unprotected segments found in step 2 have an alternate edge disjoint path segment.

It is not uncommon however, for the shortest path determined by Dijkstra's algorithm to contain path segments which are not only unprotected, but which are also unprotectable. That is, edge disjoint path segments cannot be found or do not exist for those unprotected path segments, and thus those path segments cannot be protected (i.e. are unprotectable). In this case, since an alternate path cannot be found for at least one unprotected path segment in the path, the path itself cannot be protected and should not be used where protection is required. The path must be discarded from consideration and another path must be searched for. This proves inefficient and wasteful in that valuable time and computational resources are used to search for alternate edge disjoint paths even though no such alternate path exists. A new shortest path must also be computed because the shortest path found initially is discarded for lack of protectability. This cycle could be wastefully repeated numerous times until a protectable path is found.

For the foregoing reasons, there is a need for a method whereby unprotectable paths can be identified and excluded from consideration when determining the shortest protected path. The ability to exclude unprotectable paths and consider only those paths that are protectable prior to searching for edge disjoint alternate paths will significantly enhance the speed at which path protected network routing and circuit provisioning is effected.

SUMMARY OF THE INVENTION

The invention comprises a new and improved method for computing the shortest protectable paths in communication networks, and an improved method for establishing and defining protected paths. For automated routing of unidirectional or bi-directional protected circuits in SONETs or other switched networks, Dijkstra's algorithm is used to find the shortest path between two network elements. Then, for each (primary) path segment that is not protected an alternate path segment is identified to accommodate path protection. Because there could be unprotected path segments which do not have alternate and edge disjoint path segments, such path segments are excluded from consideration in routing the shortest path in the case of required path protection.

It is an object of the invention to identify and exclude from further consideration, shortest paths which are unprotectable when computing the shortest path in network routing. To this end, it is also an object of the invention to identify and exclude unprotectable path segments and unprotectable links.

It is a further object of the invention to enable a more rapid determination of shortest protected paths leading to more rapid routing of network paths and increased network efficiency. It is a further object of the invention to improve the efficiency of and reduce the computational resources required for routing protected paths within communication networks.

The invention utilizes a new algorithm to exclude from consideration as the "shortest path" between two network elements, a path for which adequate protection cannot be established. Because there are additional computational steps in defining the protected paths after the shortest path has been found, and because some of the shortest paths found will be unprotectable, consideration of unprotectable paths when attempting to define protected paths will be in vain and wasteful of resources. An unprotectable path can be identified and excluded because an unprotectable path contains one or more unprotectable links, and these unprotectable links can be identified and excluded based upon whether or not the link is a member of a loop. This initial exclusion of unprotectable paths from consideration eliminates this potential waste of resources and speeds up the computation efficiency in network path routing.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. More specifically, the invention may be implemented on a variety of hardware and software platforms, and is not limited to any particular processor, hardware configuration, operating system, or development language, as will be evident to those skilled in the art.

The invention comprises a method for defining protected paths, which implements a new algorithm, and which not only determines the shortest path, but which also determines the shortest protectable path. As discussed above, the Shortest Path Tree (SPT) algorithm computes the shortest path between one network element, the source, and every other element or node in the network. These shortest paths are paths for which the sum of the cost metrics for all links in a given path is a minimum. However, this determination does not insure that the shortest path found is protectable (i.e., that the unprotected path segments have alternate edge disjoint segments). The new algorithm includes a method whereby the protectability of the shortest path is also established. That is, the new algorithm returns not simply the shortest path, but returns the shortest protectable path.

Figure 5:
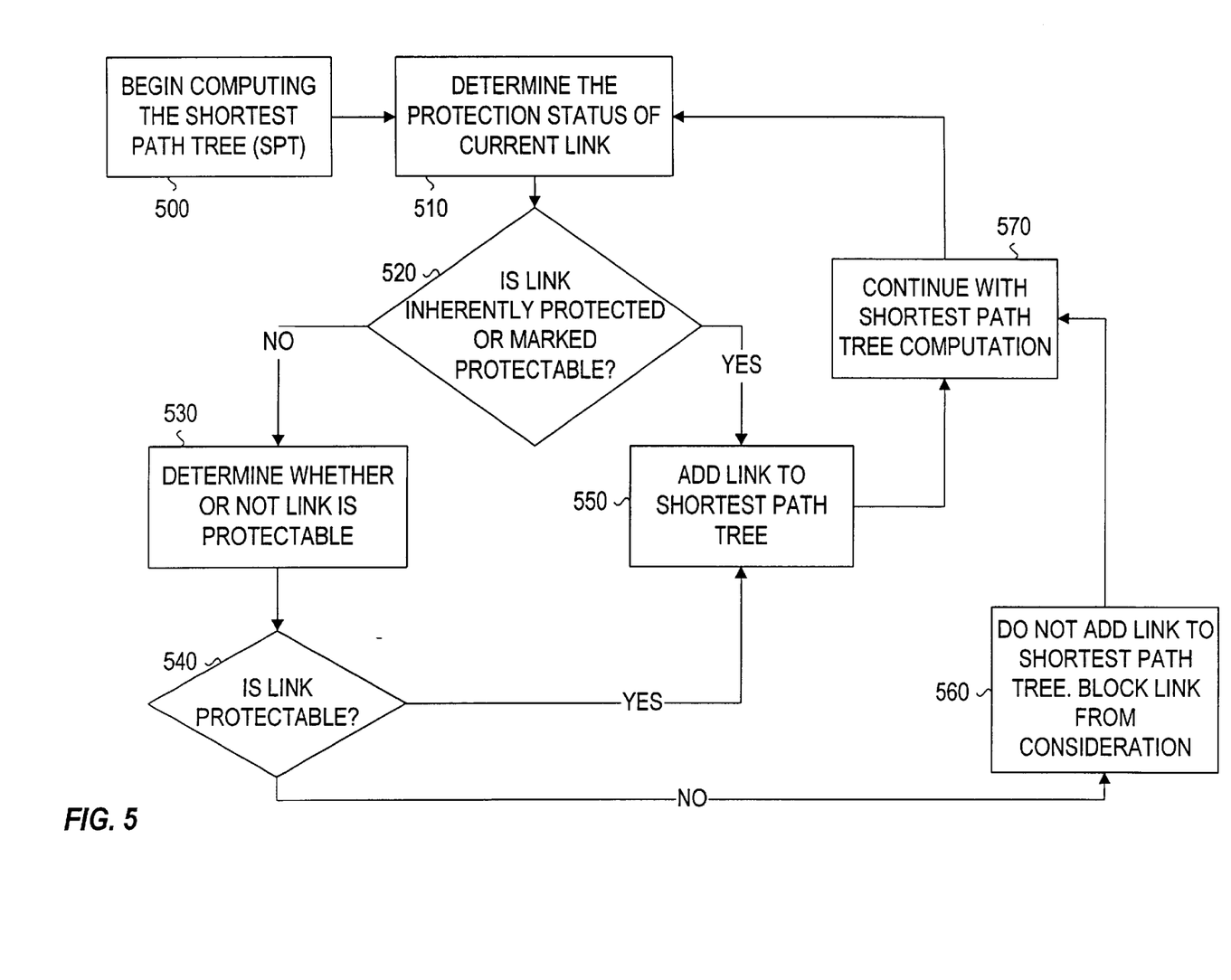
FIG. 5 shows the procedure by which the new algorithm identifies and excludes unprotectable path segments.

The procedure by which the new algorithm identifies and excludes unprotectable path segments is now explained. Reference to FIG. 5 will serve to illustrate the procedure. After a source node is specified the first step is the generation of the SPT (500). The source node is the root of the tree, and the SPT algorithm constructs the shortest paths to all other nodes. The growth of the tree can be further directed by providing the new algorithm with various parameters to govern its behavior. Examples of such parameters include a list of preferred links, a list of blocked links, and a list of blocked nodes, the relevance of which will be explained in further detail below.

The generation of the tree begins at the root or source node, and proceeds generally according to Dijkstra's generic SPT algorithm, with the aforementioned additional parameters. However, according to the present invention, before a link is added to the tree, the protection status of that link is determined (510). That is, a determination of whether or not the link is inherently (line) protected or whether it has been previously marked as protectable (520) is made. In the case of line protection, this information can be elicited by various methods including the auto-discovery method discussed earlier and discussed further herein. Whether or not the link is marked as protectable will depend on whether or not a determination has yet been made as to the protectability of the link. The method of such determination will be described in detail later. If the link is protected or marked as protectable, then the link is added to the SPT (550) and the tree generation continues (570). However, if the link is neither protected nor marked as protectable, then a determination is made as to whether or not the link is protectable (530).

Figure 6:
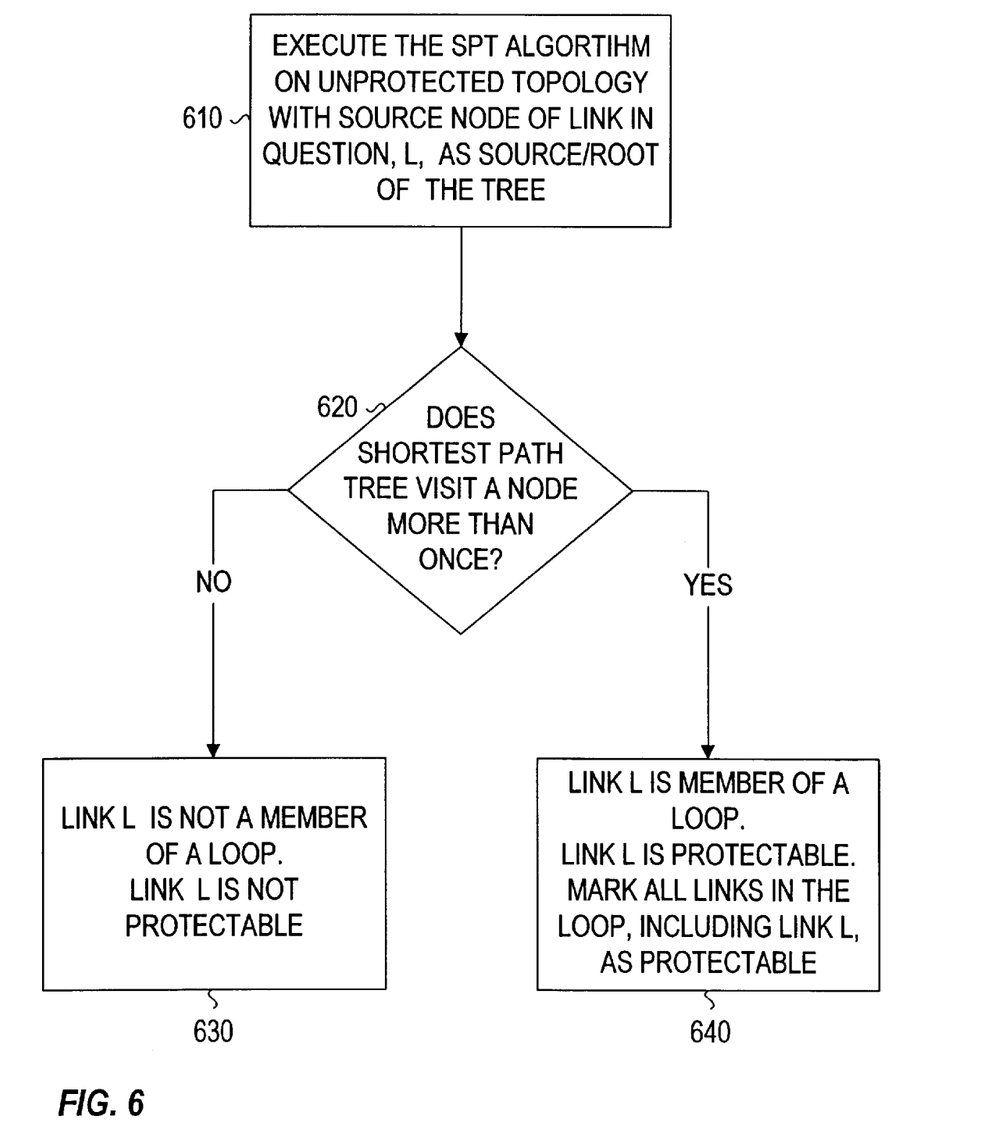
FIG. 6 shows the procedure by which a link is determined to be either protectable or unprotectable.

The determination of whether or not a link is protectable is based on determining whether or not the link in question is a member of a loop, as illustrated in FIG. 6. This determination is made by executing the SPT algorithm again, this time with the source node of the link in question, as the root of the tree (610). This execution of the SPT algorithm is run on the unprotected topology. If the SPT algorithm visits a destination node (i.e., non-source node) more than once, than the link L is determined to be part of a loop (620). This is due to the fact that the same node will not be visited more than once unless it can be reached by more than one path. Thus, if a node can be reached by, for example, two separate paths from a given source node, then those two nodes (source and destination) are part of a loop, and any of the intervening links along those two separate paths are members of the loop. When such a loop is detected, then all the links which are members of the loop are marked as protectable (640). The marking of the individual links (loop members) as protectable is accomplished by beginning at the loop destination node (i.e. the node which was visited more than once by the SPT) and traversing each path back to the source node, link by link, and marking each link as protectable in the process.

This determination of whether a link is a member of a loop, and if so how the links which make up the loop are marked protectable can be illustrated with reference to FIGS. 2 and 3. Let the link in question, L, be the link between N1 and N2. FIG. 2 shows that link L is a member of a loop (N1-N3-N4-N2-N1). In order to determine whether or not a link is a member of a loop, another instance of SPT is spawned (i.e. the SPT algorithm is executed again) with the source of link L as the source of the SPT. A loop is detected when a destination node is visited more than once during this SPT generation. FIG. 3 shows the paths considered during SPT generation indicating how the presence of the loop is determined. In this instance, N1 is the source of link L and so becomes the source of the SPT. As shown in FIG. 3, node N2 is visited twice (via different paths); at step 3 (N1-N3-N4-N2) and at step 4 (N1-N2); Link L is thus shown to be a member of a loop because a destination node (N2) is visited more than once by the SPT.

Returning now to the overall computation of the shortest protectable path and with reference to FIG. 5, if the link is deemed protectable (540-yes) then it is added to the tree (550) and computation of the tree continues (570). If however, the link is determined to not be protectable (540-no), then the link is discarded from consideration and blocked (560). The generation of the tree continues (570) with the unprotectable link blocked (560), such that it does not become part of the tree, and thus will not be a member of any shortest path determined by the new algorithm. This is how the shortest protectable path is computed. Because each link is checked for protectability, and because any unprotectable links will be identified and excluded from the shortest path tree, the only paths which will be generated by the SPT will be protectable. The output of this extended algorithm is the shortest protectable path. This is the shortest path for which each link in the path is protectable. This insures that for each unprotected segment in a path, alternate disjoint segments can be found and thus the path can be protected. Thus, a method for computing the shortest protectable path has been defined.

The mechanism by which the protection status of a link, and the unprotected topology is generated will now be described. There are several ways of extracting network topology information including the identification and status of the network elements and their associated links which are well known to those skilled in the art. One such method of automatically deriving the network topology including the status of nodes and links (e.g. whether they are active, blocked, etc.) as well as other link state information including protection information is described in detail in the co-pending application, Ser. No. 09/478,287, U.S. Pat. No. 6,614,785, filed on Jan. 5, 2000, entitled "Automatic Propagation of Circuit Information in a Communications Network," which describes a method of automatically detecting network topology and protection, and which is incorporated herein by reference. One application of the topology auto-discovery invention is the ability to determine whether or not any given link is protected. Because the protection status of each link in the network can be determined, an associated topology object can be defined. The unprotected topology object consists of all the unprotected links in the network. As discussed above, in the preferred embodiment, the determination of whether or not a link is part of a loop is made on the unprotected topology only. That is, the SPT algorithm is run on the unprotected topology when determining whether or not the link is protectable. The algorithm uses the source node of the link in question as the source node or root of the SPT. Because the loop-determining step is carried out on the unprotected topology, any loops identified will be loops comprising unprotected links. While in the preferred embodiment, and for bandwidth considerations, the unprotected topology is utilized to identify loops, the invention is in no way limited to only utilizing the unprotected topology. The identification of loops and the subsequent finding of edge disjoint paths can be performed on any subset of the complete topology, including the complete topology itself.

Figure 7:
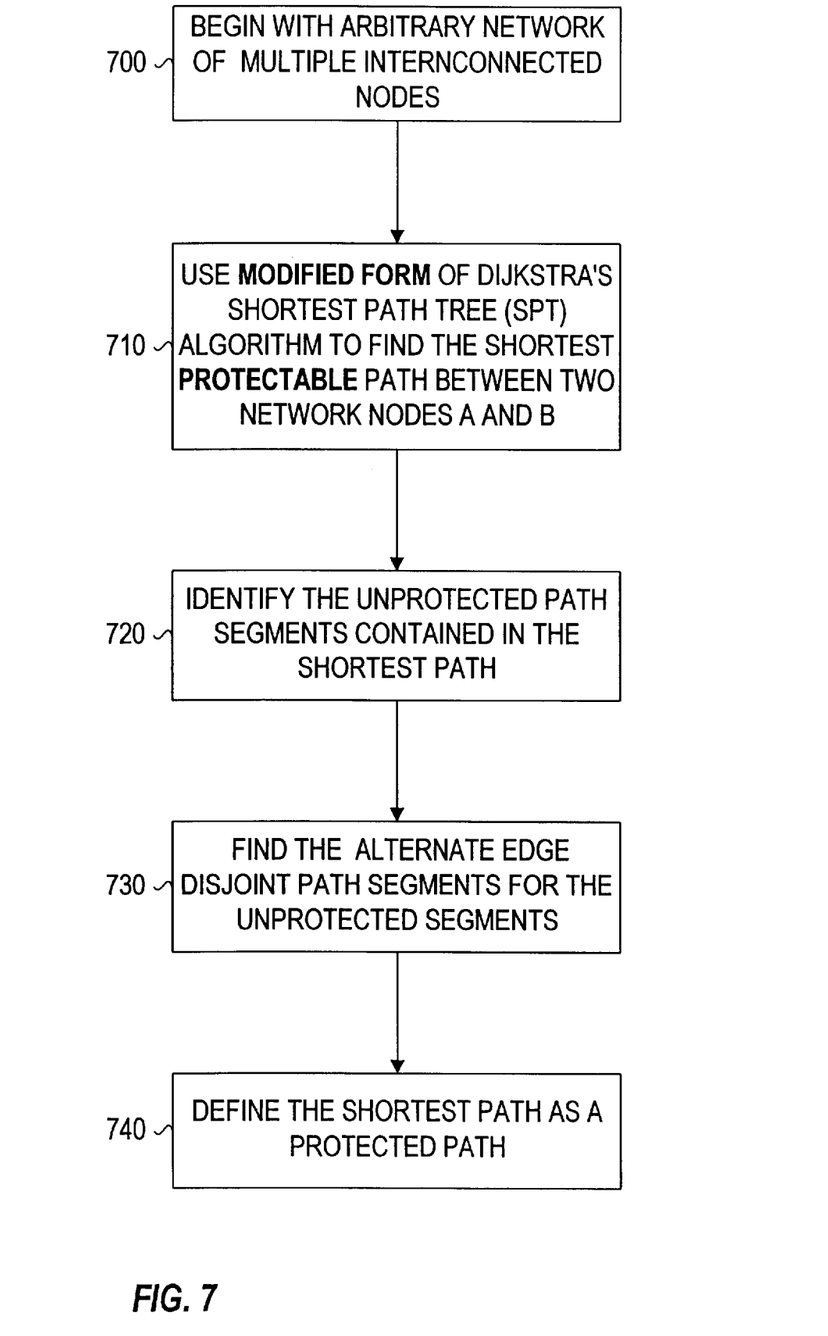
FIG. 7 illustrates the procedure for defining protected paths within a network according to the present invention.

FIG. 7 illustrates the procedure for defining protected paths within a network according to the present invention. The first step, as already explained, is the determination of the shortest protectable path (710). The next step is the identification of the unprotected path segments (720) contained in the shortest protectable path (710). A path segment is a logical or physical set or sequence of contiguous links, where all links in a particular path segment have the same level of protection. That is, all the links are either protected or unprotected. Thus, the path segment is either protected or unprotected and each link in a protected path segment is protected, whereas each link in an unprotected path segment is unprotected. This is a mechanism used to subset a path into protected and unprotected path segments. The path is traversed link by link, and whenever the Boolean protection value of a link changes (i.e. differs from the preceding link), a new path segment is defined. In this way, a path can be defined as an alternating sequence of protected and unprotected segments.

Then, for each unprotected path segment in the shortest path, a search is made for an alternate edge disjoint path segment (730). In the preferred embodiment, edge disjoint path segments are identified by either executing the SPT algorithm using the source of the path segment as the root of the tree and with the current primary unprotected path segment blocked, or alternatively, in the case the SPT already exists, simply blocking the primary segment and obtaining from the SPT an alternate path between the same two nodes as that of primary segment. As is readily apparent, the search for edge disjoint alternate paths will be successful since the new algorithm removed from consideration, paths that are unprotectable. If unprotectable paths had not been excluded, as is done by the present invention, futile searches for edge disjoint paths would have ensued for those paths that are unprotectable. Thus, time and other computational resources have been saved, and network reliability increased by preventing consideration of unprotectable paths.

The final step in the path provisioning sequence is that of defining the protected paths (740). This is simply the defining of the virtual UPSR path switched segments (PSS), meaning that for each unprotected path segment, an alternate edge disjoint path segment (already found) is associated with the primary segment to form a path protected pair.

The methods described herein, as will be evident to those of ordinary skill in the art, can be implemented as software programs which can be stored on computer readable media, and which can be executed on a variety of hardware/software platforms. In addition, the methods described herein can be coded in a variety of programming languages including but not limited to the object oriented languages JAVA and C++, and such code can be interpreted, compiled, stored and executed on a variety of platforms as will be evident to those of ordinary skill in the art.

Although this invention has been illustrated by reference to specific embodiments, it will be apparent to those skilled in the art that various changes and modifications may be made which clearly fall within the scope of the invention. The implementation of the invention is not in any way restricted to particular software methods. As will be evident to those skilled in the art, the generic methods described herein can be implemented in a many different ways. The invention is intended to be protected broadly within the spirit and scope of the appended claims.

What is claimed is:

1. In a networked environment containing multiple interconnected nodes, a method for automatically identifying and excluding unprotectable path segments from a proposed route, said method comprising:
   (a) determining a proposed route, wherein said proposed route is determined using only links that have not previously been identified as being unprotectable;
   (b) identifying unprotected links of said proposed route;
   (c) determining whether or not each of said unprotected links is a member of a loop; and
   (d) identifying and excluding from said proposed route any unprotected links that are determined not to be members of the loop.

2. The method in claim 1, wherein said determining whether or not each of said unprotected links is a member of a loop is performed on a topology of unprotected links.

3. In a networked environment containing multiple interconnected nodes, a method for identifying and excluding unprotectable links when generating a shortest path tree (SPT), the method comprising:
   (a) determining whether or not a link in the proposed path is protected;
   (b) if the link is not protected, determining if the unprotected link is a member of a loop;
   (c) labeling the unprotected link as protectable if the link is a member of the loop; and
   (d) excluding the unprotected link from shortest path consideration if the link is not labeled as protectable.

4. The method in claim 3, wherein said determining if the unprotected link is a member of a loop is performed on a topology of unprotected links.

5. The method in claim 3, wherein said determining if the unprotected link is a member of a loop occurs during and as a part of said generation of the SPT.

6. In a networked environment containing multiple interconnected nodes, a method for identifying the shortest protectable path between two network elements, said method comprising:
   (a) determining a shortest path between the two network elements using only links that have not previously been identified as being unprotectable;
   (b) determining which links of the shortest path are unprotected;
   (c) determining whether or not each of the unprotected links is a member of a loop; and
   (d) identifying as a shortest protectable path, the shortest path for which each of the unprotected links is a member of the loop.

7. The method in claim 6, wherein said determining whether or not each of the unprotected links is a member of a loop is performed on a topology of unprotected links only.

8. The method in claim 6, wherein said determining whether or not each of the unprotected links is a member of a loop occurs during and as a part of said determining a shortest path.

9. In a networked environment containing multiple interconnected nodes, a method of supporting the routing and provisioning of circuits, the method comprising:
   (a) identifying protected path segments and unprotected path segments that are protectable;
   (b) determining the shortest protectable path between two network elements using only path segments which include said protected path segments and said unprotected path segments that are identified as protectable;
   (c) determining which of said path segments of said shortest protectable path are said unprotected path segments;
   (d) finding at least one alternate edge disjoint path segment for each of said unprotected path segments; and
   (e) defining protected paths as those paths for which each unprotected path segment has at least one alternate edge disjoint path segment.

10. The method of claim 9, wherein said method is used to support establishing paths for virtual path protected circuits in SONET.

11. In a networked environment containing multiple interconnected nodes, a method for establishing a protected route comprising:
   (a) collecting network topology data from a set of network elements, including link protection information;
   (b) classifying each link in the networked environment as protectable or unprotectable, wherein said classifying each link in the networked environment as protectable or unprotectable is accomplished by determining whether or not a link is a member of a loop, the link being classified as protectable if the link is a member of a loop, and as unprotectable if the link is not a member of a loop; and
   (c) determining the shortest protectable route using protectable links, wherein the shortest protectable route does not contain unprotectable links.

12. The method of claim 11, wherein said determining whether or not a link is a member of a loop, is performed on a topology of unprotected links.

13. In a networked environment containing multiple interconnected nodes, a method for establishing a protected route comprising:
   (a) collecting network topology data from a set of network elements, including link protection information;
   (b) classifying each link in the networked environment as protectable or unprotectable;
   (c) determining the shortest protectable route using protectable links wherein the shortest protectable route does not contain unprotectable links; and
   (d) establishing a protected route through the network elements, wherein said establishing a protected route through the network elements is accomplished by finding edge disjoint path segments for each contiguous sequence of unprotected links in the shortest protectable route.

14. A computer program embodied on a computer readable medium for automatically identifying and excluding unprotectable links from a proposed route in a networked environment containing multiple interconnected nodes, said computer program comprising:
   (a) a code segment for determining the proposed route, wherein the proposed route is determined using only links that have not previously been identified as being unprotectable;
   (b) a code segment for identifying the unprotected links of the proposed route;
   (c) a code segment for determining whether or not each of the unprotected links is a member of a loop; and
   a code segment for identifying and excluding from the proposed route any unprotected links that are determined not to be members of the loop.

15. The computer program of claim 14, wherein said code segment for determining whether or not each of the unprotected links is a member of a loop performs the determination on a topology of unprotected links.

16. A computer program embodied on a computer readable medium for identifying and excluding unprotectable links when generating a proposed shortest path in a networked environment containing multiple interconnected nodes, said computer program comprising:
   (a) a code segment for determining whether or not a link in the proposed shortest path is protected;
   (b) a code segment for determining if an unprotected link is a member of a loop and labeling said link as protectable if said link is a member of the loop; and
   (c) a code segment for excluding a link from shortest path consideration if the link is not labeled as protectable.

17. The computer program of claim 16, wherein said code segment for determining if an unprotected link is a member of a loop performs the determination on a topology of unprotected links during and as a part of the generating a proposed shortest path.

18. A computer program embodied on a computer readable medium for generating a shortest protectable path between two network elements in a networked environment containing multiple interconnected nodes, said computer program comprising:
   (a) a code segment for determining a shortest path between the two network elements;
   (b) a code segment for determining which links of the shortest path are unprotected;
   (c) a code segment for determining whether or not each of the determined unprotected links is a member of a loop; and
   (d) a code segment for identifying the shortest protectable path as the shortest path for which each of said unprotected links is a member of the loop.

19. The computer program of claim 18, wherein said code segment for determining whether or not each of the determined unprotected links is a member of a loop performs said determination on only a topology of unprotected links during and as apart of the generating a shortest protectable path.

20. A computer program embodied on a computer readable medium for supporting the routing and provisioning of circuits in a networked environment containing multiple interconnected nodes, said computer program comprising:
  (a) a code segment for identifying protected path segments and unprotected path segments that are protectable;
  (b) a code segment for determining the shortest protectable path between two network elements using only path segments which include said protected path segments and said unprotected path segments that are identified as protectable;
  (c) a code segment for determining which of said path segments of said shortest protectable path are said unprotected path segments;
  (d) a code segment for finding at least one alternate edge disjoint path segment for each of said unprotected path segments; and
  (e) a code segment for defining protected paths as those paths for which each unprotected path segment has at least one alternate edge disjoint path segment.

21. The computer program of claim 20, wherein said computer program is used to support establishing paths for virtual path protected circuits in SONET.

22. A computer program embodied on a computer readable medium for establishing a protected route in a networked environment containing multiple interconnected nodes, said computer program comprising:
  (a) a code segment for collecting network topology data, including link protection information, from a set of network elements;
  (b) a code segment for classifying each link in the networked environment as protectable or unprotectable, wherein said code segment for classify each link in the networked environment as protectable or unprotectable determines whether or not each link is a member of a loop, and classifies the link as protectable if the link is a member of the loop or unprotectable if the link is not a member of the loop; and
  (c) a code segment for determining the shortest protectable route using only links classified as being protectable, wherein the shortest protectable route does not contain unprotectable links.

23. The computer program of claim 22, wherein the determination of whether or not a link is a member of a loop is performed on a topology of unprotected links.

24. A computer program embodied on a computer readable medium for establishing a protected route in a networked environment containing multiple interconnected nodes, said computer program comprising:
  (a) a code segment for collecting network topology data, including link protection information, from a set of network elements;
  (b) a code segment for classifying each link in the networked environment as protectable or unprotectable;
  (c) a code segment for determining the shortest protectable route using only links classified as being protectable, wherein the shortest protectable route does not contain unprotectable links; and
  (d) a code segment for establishing the protected route through the network elements, wherein said code segment for establishing the protected route through the network elements identifies edge disjoint path segments for each contiguous sequence of unprotected links in said shortest protectable route.

25. The method in claim 1, further including:
  (e) labeling said unprotected links that are determined not to be members of the loop as unprotectable.

26. In a networked environment containing multiple interconnected nodes, a method for automatically identifying and excluding unprotectable path segments from a proposed route, said method comprising:
  (a) identifying potential links to be included in a proposed route, wherein said proposed route is to be determined using only links that have not previously been identified as being unprotectable;
  (b) identifying unprotected links of said potential links;
  (c) determining whether or not each of said unprotected links is a member of a loop;
  (d) identifying and excluding from said potential links any unprotected links that are determined not to be members of the loop; and
  (e) determining the proposed route using said potential links which exclude the unprotected links that are determined not to be members of the loop.

* * * * *